(12) United States Patent
Ohno et al.

(10) Patent No.: US 7,407,702 B2
(45) Date of Patent: Aug. 5, 2008

(54) POLYMETAPHENYLENE ISOPHTHALAMIDE-BASED POLYMER POROUS FILM, PROCESS FOR ITS PRODUCTION AND BATTERY SEPARATOR

(75) Inventors: Takao Ohno, Iwakuni (JP); Jiro Sadanobu, Iwakuni (JP); Tsutomu Nakamura, Iwakuni (JP); Susumu Honda, Iwakuni (JP); Toyoaki Ishiwata, Iwakuni (JP)

(73) Assignee: Teijin Limited, Osaka (JP)

( * ) Notice: Subject to any disclaimer, the term of this patent is extended or adjusted under 35 U.S.C. 154(b) by 48 days.

(21) Appl. No.: 10/776,184

(22) Filed: Feb. 12, 2004

(65) Prior Publication Data

US 2004/0161598 A1 Aug. 19, 2004

Related U.S. Application Data

(63) Continuation of application No. 10/030,247, filed as application No. PCT/JP00/06234 on Sep. 12, 2000, now abandoned.

(30) Foreign Application Priority Data

| Sep. 13, 1999 | (JP) | 11-258734 |
| Sep. 13, 1999 | (JP) | 11-258735 |
| Feb. 10, 2000 | (JP) | 2000-33188 |
| May 12, 2000 | (JP) | 2000-140086 |
| Jun. 19, 2000 | (JP) | 2000-182973 |

(51) Int. Cl.
    B32B 5/22     (2006.01)
    B01D 39/14    (2006.01)
    B05D 1/22     (2006.01)

(52) U.S. Cl. ............... 428/317.9; 428/315.5; 428/315.7; 428/319.3; 428/319.7; 428/319.9; 210/500.38; 427/434.2

(58) Field of Classification Search .............. 428/317.9, 428/315.5, 315.7, 319.3, 319.7, 319.9; 429/248, 429/251; 210/500.38; 427/434.2
    See application file for complete search history.

(56) References Cited

U.S. PATENT DOCUMENTS

| 3,094,511 A | 6/1963 | Hill et al. |
| 3,658,529 A | 4/1972 | Yeshin |
| 4,539,393 A | 9/1985 | Tamura et al. |
| 5,002,843 A * | 3/1991 | Cieslak et al. .............. 429/101 |
| 5,296,318 A | 3/1994 | Gozdz et al. |
| 5,571,634 A | 11/1996 | Gozdz et al. |
| 5,571,875 A | 11/1996 | Tsutsumi et al. |
| 5,688,596 A | 11/1997 | Makino et al. |
| 5,888,666 A | 3/1999 | Kawakami |
| 6,291,106 B1 * | 9/2001 | Daido et al. ................ 429/306 |
| 6,447,958 B1 * | 9/2002 | Shinohara et al. ........... 429/248 |

FOREIGN PATENT DOCUMENTS

| DE | 41 27 603 A1 | 2/1993 |
| DE | 199 18 856 A1 | 11/1999 |
| JP | 53-74571 | 7/1978 |
| JP | 53-144974 | 12/1978 |
| JP | 56-2804 | 1/1981 |
| JP | 56-133339 | 10/1981 |
| JP | 58-58113 | 4/1983 |
| JP | 59-14494 B | 4/1984 |
| JP | 59-36939 | 9/1984 |
| JP | 60-52 A | 1/1985 |
| JP | 60-136161 A | 7/1985 |
| JP | 63-108664 A | 5/1988 |
| JP | 63-108665 A | 5/1988 |
| JP | 63-156836 | 6/1988 |
| JP | 2-232242 A | 9/1990 |
| JP | 3-64334 A | 3/1991 |
| JP | 4-56062 A | 2/1992 |
| JP | 5-56251 B | 8/1993 |
| JP | 5-335005 A | 12/1993 |
| JP | 7-37571 A | 2/1995 |
| JP | 7-78608 A | 3/1995 |
| JP | 9-289038 A | 11/1997 |
| JP | 10-64503 A | 3/1998 |
| JP | 2000-30686 | 1/2000 |
| JP | 2000-191823 | 7/2000 |

OTHER PUBLICATIONS

Patent Abstracts of Japan, JP 10006453 A, dated Jan. 13, 1998.
Database WPI, JP 52 109569 A, dated Sep. 13, 1977, Derwent Publications Ltd., London, GB.
Database WPI, JP 2001 206973 A, dated Jul. 31, 2001, Derwent Publications Ltd., London, GB.
Database WPI, JP 05 335005 A, dated Dec. 17, 1993, Derwent Publications, Ltd., London, GB.
L. Palacio, et al, "Porosity measurements by a gas penetration method and other techniques applied to membrane characterization," *Thin Solid Films*, Elsevier-Sequoia S.A., vol. 348, No. 1-2, Jul. 6, 1999, pp. 22-29.
"Property Information" article, 2 pages.

* cited by examiner

*Primary Examiner*—Hai Vo
(74) *Attorney, Agent, or Firm*—Sughrue Mion, PLLC

(57) ABSTRACT

A polymetaphenylene isophthalamide-based polymer porous film having a satisfactory porous structure that exhibits excellent gas permeability and heat resistance. It is produced by a process which comprises casting a dope of the polymetaphenylene isophthalamide-based polymer and coagulating it in a coagulating bath. The porous film may also contain inorganic whiskers, and a composite porous film may be formed in combination with a separate thermoplastic polymer film.

34 Claims, 3 Drawing Sheets

Figure 1:
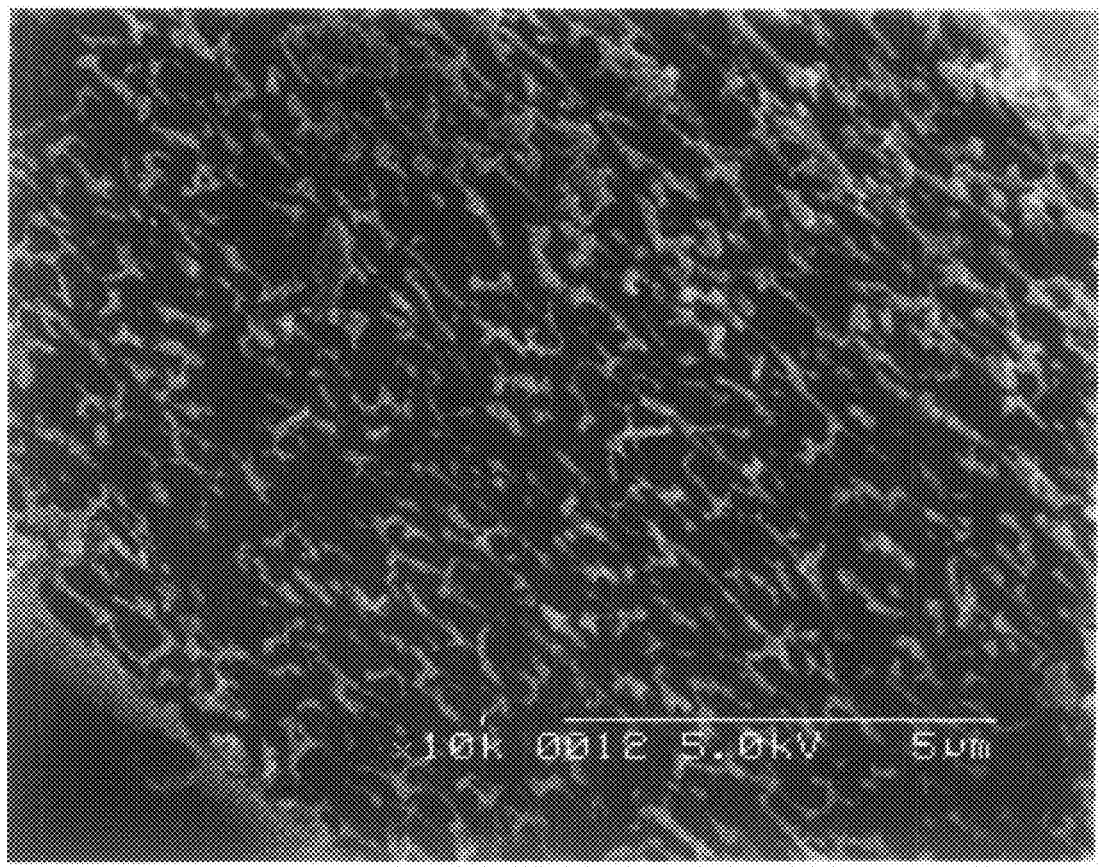
Figure 2:
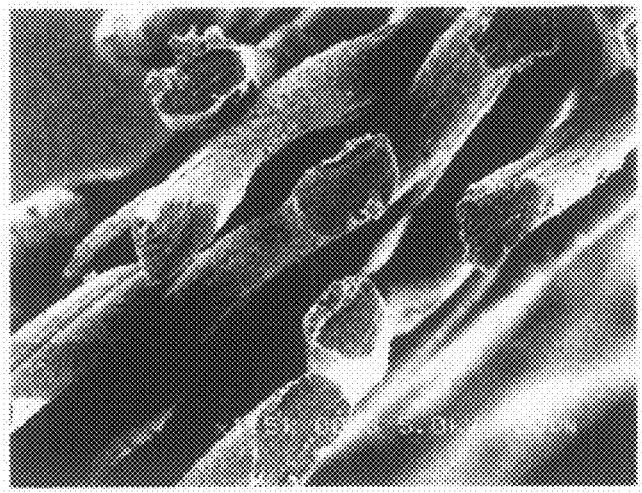
Figure 2:
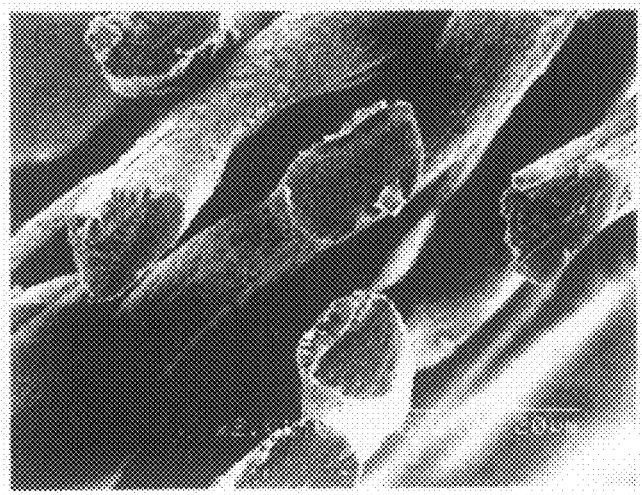
Figure 2:
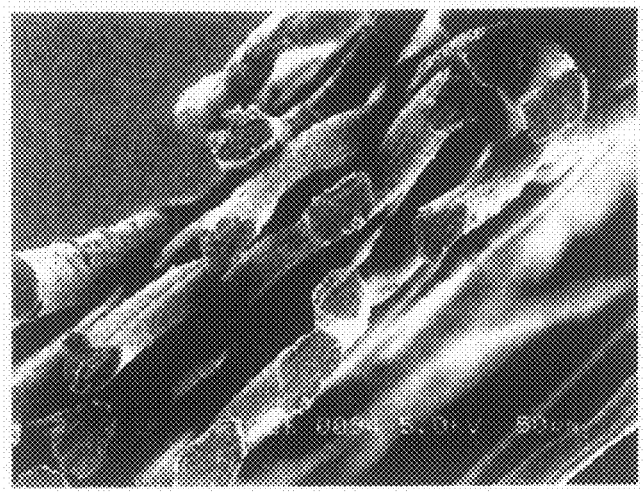
Figure 3:
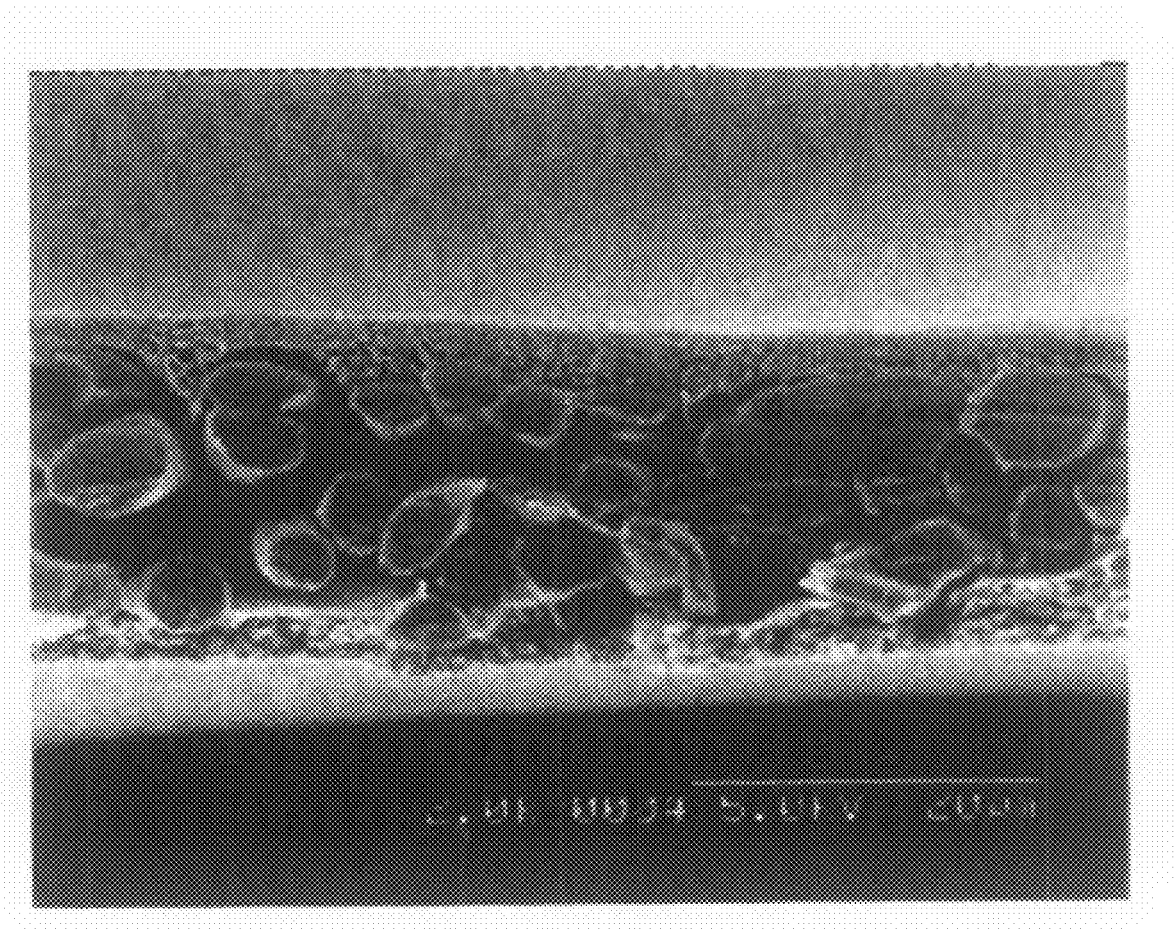

Aramid porous film aramid reinforcing material 1 aramid reinforcing material 2 aramid reinforcing material 3

PVdF/Aramid paper/PVdf

POLYMETAPHENYLENE ISOPHTHALAMIDE-BASED POLYMER POROUS FILM, PROCESS FOR ITS PRODUCTION AND BATTERY SEPARATOR

This is a Continuation of application Ser. No. 10/030,247 filed Jan. 9, 2002 now abandoned, which is a National Stage Application of PCT Application No. PCT/JP00/06234 filed Sep. 12, 2000; the above noted prior applications are all hereby incorporated by reference.

TECHNICAL FIELD

The present invention relates to a heat resistant porous film made of a polymetaphenylene isophthalamide-based polymer, to a process for production of the porous film and to a battery separator-comprising the porous film.

BACKGROUND ART

Polyolefin-based films, including those comprising polypropylene, have been known as porous films according to the prior art, but these films lack heat resistance and when used at temperatures exceeding 180° C., for example, such films and their pores undergo considerable dimensional changes, leading to such problems as reduced function as a porous films.

Aromatic polyamides are known as alternative films with excellent heat resistance, and porous films of these polymers are described in Japanese Examined Patent Publication No. 59-14494 and No. 59-36939. In recent years, however, there has been a trend toward thinner porous films which has also led to a higher Young's modulus required for such films; as the current processes have not allowed production of aromatic polyamide porous films with adequate Young's moduli, it has been attempted to improve the Young's modulus through orientation and crystallization achieved by stretching. However, the conventional processes have been associated with problems such as, for example, destruction of the porous structure due to softening at the high stretching temperatures for dry hot stretching, causing densification and closing of the pores, or failure to achieve an increased draw ratio due to the low temperatures of stretching in boiling water, such that the Young's modulus cannot be improved.

On the other hand, several different types of products have been developed as sheets to be used as battery separators for lithium ion batteries and the like, among which synthetic fiber nonwoven fabrics are widely used because of their excellent gas permeability and impregnating ability and satisfactory mechanical properties (for example, Japanese Unexamined Patent Publications No. 63-108664, No. 63-108665 and No. 4-56062). Problems that typically occur with batteries include deformation, extrusion of contents and ignition as a result of overcharging or external shorting, and such problems have been countered by adopting the use of highly heat resistant and chemically resistant aromatic polyamide porous films as separators for batteries, as disclosed in the aforementioned Japanese Unexamined Patent Publications No. 59-14494 and No. 59-36939. In addition, the use of nonwoven fabrics or sheets made of wholly aromatic polyamide (aramide) fibers as battery separators has been proposed in Japanese Unexamined Patent Publications No. 5-335005, No. 7-78608 and No. 7-37571. Nevertheless, while such battery separators exhibit lower internal electrical resistance and more excellent electrical properties with smaller thicknesses, it is very difficult to industrially produce them to thicknesses of 50 μm or smaller with adequate strength and with excellent uniformity, when such films, nonwoven fabrics and sheets as described above are used.

A separator in a battery is an important member situated between the positive electrode and the negative electrode, and recent years have seen modifications designed to provide a shutdown function for separators in order to meet the contradictory requirements of expected electrical properties and safety. Shutdown refers to cutting off the current, due to closing of the pores as the porous film of the separator melts upon increased battery temperature, that occurs in the event of troubles such as overcurrent or external shorting. For this purpose, Japanese Unexamined Patent Publications No. 60-52 and No. 60-136161 have proposed using supports consisting of porous films made of polyethylene or polypropylene that allow manufacture of such thin porous films, and including a low melting point obstructive material capable of melting with heat, such that at high temperatures the obstructive material melts and plugs the pores of the porous film to provide a shutdown function. However, since such materials employ polyethylene or polypropylene thermoplastic films as the base materials, the heat resistance is low and there are many restrictions on their use from a safety standpoint.

DISCLOSURE OF THE INVENTION

In light of these circumstances, it is an object of the present invention to provide an aromatic polyamide-based polymer porous film with excellent heat resistance, chemical resistance and dimensional stability, as well as a high Young's modulus and sufficient gas permeability.

It is another object of the invention to provide a process for the production of the aromatic polyamide-based polymer porous film.

It is yet another object of the invention to provide a battery separator employing the aromatic polyamide-based polymer porous film.

It is still yet another object of the invention to provide a composite film comprising the aromatic polyamide-based polymer porous film, and a battery separator employing it.

It is still yet another object of the invention to provide a battery employing the battery separator.

As a result of diligent research aimed at overcoming the aforementioned problems, the present inventors have completed the present invention upon finding that it is possible to obtain a polymetaphenylene isophthalamide-based polymer porous film (hereunder also referred to simply as "a polyamide porous film") with a high Young's modulus using a polymetaphenylene isophthalamide-based polymer, by casting a dope prepared by dissolving the polymer in an amide-based solvent, coagulating it in a coagulating bath comprising an amide-based solvent containing a non-solvent for the polymer and then, optionally, subjecting it to specific treatment such as stretching.

The present invention therefore provides a polymetaphenylene isophthalamide-based polymer porous film with a gas permeability of 0.2-1000 ml/sec, and which retains at least 60% of its gas permeability after heat treatment at 350° C. for 10 minutes, compared to before treatment.

The invention further provides a polymetaphenylene isophthalamide-based polymer porous film having a porous structure with a porosity of 60-80%, a cross-sectional pore laminar coefficient of 2.5 or greater, and a specific Young's modulus of 300-800 $(kgf/mm^2)/(g/m^3)$ in at least one direction.

The invention still further provides a polymetaphenylene isophthalamide-based polymer porous film with a gas permeability of 0.2-1000 ml/sec, and which retains at least 60% of its gas permeability after heat treatment at 350° C. for 10 minutes compared to before treatment, while also having a porous structure with a porosity of 60-80%, a cross-sectional pore laminar coefficient of 2.5 or greater, and a specific Young's modulus of 300-800 $(kgf/mm^2)/(g/m^3)$ in at least one direction.

The invention still further provides a polymetaphenylene isophthalamide-based polymer porous film containing inorganic whiskers and having a porosity of 10-80% and a specific Young's modulus of 200-5000 $(kgf/mm^2)/(g/m^3)$ in at least one direction.

The invention still further provides a process for the production of a polymetaphenylene isophthalamide-based polymer porous film that involves casting a dope prepared by dissolving a polymetaphenylene isophthalamide-based polymer in an amide-based solvent and coagulating it in a coagulating bath comprising an amide-based solvent containing a non-solvent for the polymer.

The invention still further provides a battery separator comprising a porous film according to the invention as described above.

The invention still further provides a porous film comprising at least two layers including a polymetaphenylene isophthalamide-based polymer porous layer and a heat-melting thermoplastic polymer porous layer.

The invention still further provides a battery separator comprising a composite porous film according to the invention and a lithium ion battery employing the battery separator.

BEST MODE FOR CARRYING OUT THE INVENTION

According to the first aspect of the polymetaphenylene isophthalamide-based polymer porous film of the invention, the film has a gas permeability of 0.2-1000 ml/sec and preferably 0.4-200 ml/sec, and retains at least 60% and preferably at least 70% of its gas permeability after heat treatment at 350° C. for 10 minutes, compared to before treatment. If the gas permeability is greater than 1000 ml/sec the Young's modulus is reduced and the handling properties are impaired, while if it is less than 0.2 ml/sec the pores collapse forming a dense structure. The porous film may be evaluated as having adequate heat resistance if at least 60% of the gas permeability is retained after heat treatment at 350° C. for 10 minutes.

According to the second aspect of the polymetaphenylene isophthalamide-based polymer porous film of the invention, the film has a porous structure with a porosity of 60-80% and preferably 65-75%, and a cross-sectional pore laminar coefficient of 2.5 or greater and preferably 3-500. Maintaining a porosity of 60-80% is important for uses requiring high strength and adequate permeability; a porosity of less than 60% results in a lack of porous properties, and a porosity of greater than 80% causes a lack of strength. If the cross-sectional pore laminar coefficient is 2.5 or greater, the porous structure of the film cross-section may be evaluated as satisfactory. The porous film also preferably has a specific Young's modulus of 200-800 $(kgf/mm^2)/(g/cm^3)$ at least one direction, while a specific Young's modulus of 300-700 $(kgf/mm^2)/(g/cm^3)$ is preferred for uses requiring high performance.

According to the third aspect of the polymetaphenylene isophthalamide-based polymer porous film of the invention, it has a gas permeability of 0.2-1000 ml/sec and retains at least 60% of its gas permeability after heat treatment at 350° C. for 10 minutes compared to before treatment, while also having a porous structure with a porosity of 60-80% and a cross-sectional pore laminar coefficient of 2.5 or greater, and a specific Young's modulus of 200-800 $(kgf/mm^2)/(g/cm^3)$ in at least one direction.

The polymetaphenylene isophthalamide-based polymer porous film of the invention preferably has a thickness of 1-10 μm. If the thickness is greater than 10 μm the battery capacity density may be insufficient and the ion conductivity and charge efficiency may be reduced, when it is used as a battery separator. On the other hand, if the thickness is less than 1 μm the electrolytic solution holding power and mechanical strength may be insufficient. The thickness is more preferably 2-6 μm.

A process for production of a polymetaphenylene isophthalamide-based polymer porous film according to the invention will now be explained.

According to the invention, a polymetaphenylene isophthalamide-based polymer porous film may be obtained by casting a dope prepared by dissolving the polymetaphenylene isophthalamide-based polymer in an amide-based solvent, and coagulating the cast dope in a coagulating bath comprising an amide-based solvent containing a non-solvent for the polymer.

Generally, for example, the dope is cast on a support and the cast dope is immersed in the coagulating bath while residing on the support. The coagulated film may then be rinsed with water if desired, and once the amide-based solvent and coagulating bath have been removed, it may be stretched in a stretching bath comprising an amide-based solvent containing a non-solvent for the polymetaphenylene isophthalamide-based polymer, or it may be immersed in a bath comprising an amide-based solvent containing a non-solvent for the polymetaphenylene isophthalamide-based polymer, and finally rinsed with water. In such cases, any of the aforementioned rinsing steps may be omitted, but since the solvent that is used remains in the porous film and can significantly lower the softening temperature due to a plasticizing effect unless rinsing is carried out after the stretching treatment or immersion treatment, rinsing with water is usually preferred.

The polymetaphenylene isophthalamide-based polymer used for the invention is a polymer having a structure obtained by polycondensation of a meta-aromatic diamine and a meta-aromatic dicarboxylic acid, but copolymerizable components may be used for a portion thereof. That is, the polymetaphenylene isophthalamide-based polymer is typically a polymer composed mainly of repeating units represented by the following formula:

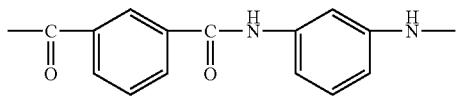

although there is no limitation to such types of polymers. The copolymerizable components may be, as examples of amine components and carboxylic acid components, para-aromatic diamines, para-aromatic dichlorides, aliphatic diamines, aliphatic dicarboxylic acids, alicyclic diamines and alicyclic dicarboxylic acids.

Specifically, as meta-aromatic diamines there may be mentioned 1,3-phenylenediamine, 1,6-naphthalenediamine, 1,7-naphthalenediamine, 2,7-naphthalenediamine and 3,4'-biphenyldiamine. As meta-aromatic dicarboxylic acids there may be mentioned isophthalic acid, 1,6-naphthalenedicarboxylic acid, 1,7-naphthalenedicarboxylic acid and 3,4-biphenyldicarboxylic acid.

As specific copolymerizable monomers there may be mentioned, as para-aromatic diamines, paraphenylenediamine, 4,4'-diaminobiphenyl, 2-methyl-paraphenylenediamine, 2-chloro-paraphenylenediamine and 2,6-naphthalenediamine; as para-aromatic dicarboxylic dichlorides, terephthalic chloride, biphenyl-4,4'-dicarboxylic chloride and 2,6-naphthalenedicarboxylic chloride; as aliphatic diamines, hexanediamine, decanediamine, dodecanediamine, ethylenediamine and hexamethylenediamine; and as aliphatic dicarboxylic acids, ethylenedicarboxylic acid and hexamethylenedicarboxylic acid. However, these are not limited to those given above.

The polymer concentration of the dope comprising the polymetaphenylene isophthalamide-based polymer of the invention dissolved in an amide-based solvent (hereunder also referred to simply as "dope") is preferably 3-30 wt %, more preferably 3-25 wt % and most preferably 5-20 wt %.

As useful amide-based solvents for the dope there may be mentioned such polar solvents as N-methyl-2-pyrrolidone, N,N-dimethylacetamide and N,N-dimethylformamide, but there is no limitation. So long as the object of the invention is not hindered, the solvents may be any that contain an amide group and dissolves the polymetaphenylene isophthalamide-based polymer that is used. Because solvents that can dissolve the polymetaphenylene isophthalamide-based polymer used for the invention are limited to amide-based solvents, the solvent used for the invention is limited to an amide-based solvent.

A monovalent or divalent cationic metal salt may also be used in order to enhance the solubility of the polymetaphenylene isophthalamide-based polymer. As a general rule it is preferred for such a metal salt to be absent for the purpose of the invention, but if it is used, the metal salt is preferably present in the amide-based solvent in an amount of 0-50 parts by weight per 100 parts by weight of the polymetaphenylene isophthalamide-based polymer, and as specific metal salts there may be mentioned calcium chloride, lithium chloride, lithium nitrate and magnesium chloride. The addition and dissolution of the metal salt in the amide-based solvent may be accomplished by a conventional method and may be done before, during or after dissolution of the polymetaphenylene isophthalamide-based polymer.

The dope is cast onto the support, and the cast dope is introduced into the coagulating bath together with the support. Here, the support may be a metal drum, an endless metal belt or an organic film, such as one made of polypropylene, polyethylene, polyethylene terephthalate or the like. It is preferably one that has been subjected to release treatment with silicone or the like.

The temperature of the dope for the casting is not particularly restricted, but it is preferably selected so that the viscosity of the dope is between 1 and 2000 poises, and more preferably between 5 and 500 poises.

In order to maintain a sheet form for the cast dope during casting, it is effective to carry out the process of the invention by selecting the temperature range for the support and the atmosphere surrounding the support or by adjustment of the atmosphere surrounding the support by air blowing, etc., but these conditions may be determined by trial and error.

The coagulating bath contains an amide-based solvent and a non-solvent for the polymetaphenylene isophthalamide-based polymer. The non-solvent for the polymetaphenylene isophthalamide-based polymer is preferably inactive with respect to the amide-based solvent.

As specific amide-based solvents there may be mentioned N-methyl-2-pyrrolidone, N,N-dimethylacetamide and N,N-dimethylformamide, among which N-methyl-2-pyrrolidone is preferred.

As non-solvents for the polymetaphenylene isophthalamide-based polymer there may be mentioned lower alcohols and lower ethers, although it is preferred to use water. Mixtures thereof may also be used.

The amide-based solvent to be used for the coagulating bath may be the same as or different from the amide-based solvent used for the dope, but using the same solvent is advantageous since it allows recovery for reuse and reduces time and effort required for disposal.

A metal salt may also be added to the coagulating bath in an amount of 1-10 wt % with respect to the total coagulating bath, for the purpose of adjusting the pore size of the resulting porous film. As specific examples of such metal salts there may be mentioned calcium chloride, lithium chloride, lithium nitrate and magnesium chloride.

The concentration of the amide-based solvent in the coagulating bath is preferably 30-80 wt % and more preferably 50-70 wt % based on the total coagulating bath. The temperature of the coagulating bath is preferably 0-98° C. and more preferably 20-90° C.

If the concentration of the amide-based solvent in the coagulating bath is less than 30 wt % or the temperature of the coagulating bath is below 0° C., the number of pores on the surface of the resulting polyamide porous film will be reduced while the pore size will be smaller, tending to give a polyamide porous film with low gas permeability. If the concentration is over 80 wt % or the temperature is above 98° C., the polymer may become granular making it impossible to obtain a polyamide porous film. If either of the temperature and concentration are outside of the aforementioned ranges, disadvantages in terms of use will be presented, though not as much as when both are outside the specified ranges.

The cast dope, which is the coagulated porous film, may also be subsequently rinsed and dried if desired.

The water rinsing is a treatment that halts coagulation and crystallization of the porous film by removing the solid component and liquid components adhering to the porous film. Without adequate rinsing, fine solid components may remain adhered to the porous film, producing scum during the hot stretching. Residual liquid components are disadvantageous in terms of cost and can produce unpleasant odors during hot stretching, or decompose, or plug the pores due to the plasticizing effect of the residual amide-based solvent or coagulating solution. However, it will usually not be necessary to carry out very thorough rinsing in order to halt coagulation and crystallization of the porous film.

The drying may be carried out to any desired extent, and normally this will involve anywhere from drying by nip roll treatment to an extent known as "hydro-extraction", to more extensive drying with a hot air drier or the like. However, in order to facilitate setting of the conditions for the subsequent hot stretching and to obtain stable results, it is preferred to keep the drying temperature within a prescribed range, for which reason the extent of drying is preferably to a moisture content of no greater than 100 parts by weight, more preferably no greater than 30 parts by weight and most preferably no greater than 5 parts by weight, per 100 parts by weight of the absolutely dry porous film.

If desired, the resulting polyamide porous film may then be subjected to stretching in a stretching bath.

First, the polyamide porous film is immersed and plasticized in a stretching bath comprising an amide-based solvent containing a non-solvent for the polymetaphenylene isophthalamide-based polymer, and is stretched therein.

As examples of useful amide-based solvents for the stretching bath there may be mentioned N-methyl-2-pyrrolidone, N,N-dimethylacetamide and N,N-dimethylformamide, of which N-methyl-2-pyrrolidone is preferred.

As non-solvents for the polymetaphenylene isophthalamide-based polymer there may be mentioned lower alcohols and lower ethers, although it is preferred to use water. Mixtures thereof may also be used.

The concentration of the amide-based solvent in the stretching bath is preferably 5-70 wt % and more preferably 30-65 wt % based on the total stretching bath. The temperature of the stretching bath is preferably 0-98° C. and more preferably 30-90° C.

If the concentration of the amide-based solvent in the stretching bath is less than 5 wt % or the temperature of the stretching bath is below 0° C., the polyamide porous film may have insufficient plasticity, and the expected Young's modulus may not be achieved. If the concentration is over 70 wt % or the temperature is above 98° C., dissolution of the polyamide porous film may proceed making it impossible to improve the Young's modulus by stretching, while the porous structure may collapse leading to greater density such that a polyamide porous film cannot be obtained.

The amide-based solvent used in the stretching bath may be the same as or different from the amide-based solvent used for the dope and/or the amide-based solvent used for the coagulating bath, but using the same solvent is advantageous since it reduces time and effort required for recovery and reuse or disposal.

The non-solvent for the polymetaphenylene isophthalamide-based polymer used in the stretching bath may also be the same as or different from the non-solvent for the polymer used in the coagulating bath, but using the same non-solvent is advantageous since it reduces time and effort required for recovery and reuse or disposal.

The stretching method may be any method such as uniaxial stretching, successive biaxial stretching, simultaneous biaxial stretching or the like. For the stretching, reduction in the gas permeability can preferably be avoided by holding and restraining both sides in the direction of stretching.

The stretch ratio is preferably 1.3-5 in the uniaxial direction or 1.3-10 in the orthogonal biaxial directions, in order to achieve a suitable balance between the porosity, gas permeability and Young's modulus. In the case of biaxial stretching, the stretching ratio of 1.3-10 may be determined as the product of the stretching ratios in both directions (the area ratio).

The stretching may be carried out continuously from the coagulating bath.

After stretching, the polyamide porous film may preferably be introduced into water for rinsing, and then dried.

Alternatively, if desired, the stretching may be followed by immersion of the resulting polyamide porous film in a bath comprising an amide-based solvent containing a non-solvent for the polymetaphenylene isophthalamide-based polymer, to promote crystallization.

As examples of useful amide-based solvents for the immersion bath there may be mentioned N-methyl-2-pyrrolidone, N,N-dimethylacetamide and N,N-dimethylformamide, among which N-methyl-2-pyrrolidone is preferred.

As non-solvents for the polymetaphenylene isophthalamide-based polymer there may be mentioned lower alcohols and lower ethers, although it is preferred to use water. Mixtures thereof may also be used.

The concentration of the amide-based solvent in the immersion bath is preferably 50-80 wt % and more preferably 60-70 wt % based on the total immersion bath. The temperature of the immersion bath is preferably 50-98° C. and more preferably 60-90° C.

If the concentration of the amide-based solvent in the immersion bath is greater than 80 wt %, dissolution of the polyamide porous film may occur leading to breakdown of the porous structure, and if it is less than 50 wt %, crystallization may not proceed adequately. Also, if the temperature of the immersion bath is below 50° C., crystallization of the polyamide porous film may not proceed or it may proceed with difficulty, and if it is above 98° C., dissolution of the polyamide porous film may occur resulting in breakdown of the porous structure.

The amide-based solvent used in the immersion bath may be the same as or different from the amide-based solvent used for the dope and/or the amide-based solvent used for the coagulating bath, but using the same solvent is advantageous since it reduces time and effort required for recovery and reuse or disposal.

The non-solvent for the polymetaphenylene isophthalamide-based polymer used in the immersion bath may also be the same as or different from the non-solvent for the polymer used in the coagulating bath, but using the same non-solvent is advantageous since it reduces time and effort required for recovery and reuse or disposal.

The immersion may be carried out continuously from the coagulating bath.

After immersion, the polyamide porous film may preferably be introduced into water for rinsing, and then dried. The rinsing and drying are preferably carried out by the same methods as described for the rinsing and drying after the coagulating treatment.

The polyamide porous film obtained after immersion preferably has an insoluble portion of at least 10% in dimethylformamide (DMF) at 20° C.

The polyamide porous film may also be subjected to heat treatment after the immersion. The heat treatment is preferably carried out at a temperature of 290-380° C., and more preferably a temperature of 330-360° C. The heat treatment is carried out for the purpose of crystallization, and a temperature of below 290° C. may result in an inadequate effect while a temperature of above 380° C. may cause decomposition of the polymer.

While heat treatment can sometimes reduce the porosity of the resulting porous film or plug the pores thus impairing the gas permeability, there is no such effect with the porous film of the invention, or at least such an effect is reduced to a minimum.

If desired, the aforementioned coagulating treatment may be followed by rinsing and drying of the resulting polyamide porous film, and then hot stretching.

That is, the polyamide porous film obtained by coagulating treatment is then rinsed and dried by the methods described above, and the polyamide porous film is then subjected to hot stretching. The stretching temperature is suitable at 270-340° C., and more preferably 290-320° C. If the stretching temperature is below 270° C. the porous film will have a lower stretch ratio and be susceptible to breaking, while if the stretching temperature is above 340° C. the porous structure may collapse or the pores thereof may be plugged, leading to greater density. The heating may be accomplished by either a contact system or non-contact system, but it should be carried out as uniformly as possible.

The stretching method may be any method such as uniaxial stretching, successive biaxial stretching, simultaneous biaxial stretching or the like. For the stretching, reduction in the gas permeability can preferably be avoided by holding and restraining both sides in the direction of stretching.

The stretch ratio is preferably 1.3-5 in the case of uniaxial stretching or 1.3-10 in the case of biaxial stretching, but it is preferably selected in order to achieve a suitable balance between the porosity, gas permeability and Young's modulus. In the case of biaxial stretching, the stretching ratio of 1.3-10 may be determined as the product of the stretching ratios in both directions (the area ratio).

Alternatively, if desired, the immersion described above may be followed by rinsing, drying and hot stretching of the obtained polyamide porous film. The rinsing temperature is not particularly restricted, but a greater rinsing effect is generally achieved by using hot water.

In this case, the immersion time is preferably 3-20 minutes when the temperature of the immersion bath is 50° C. or higher, since this gives more suitable crystallization and helps to stabilize the subsequent stretching conditions. The immersion time is more preferably 5-15 minutes.

Next, the polyamide porous film is subjected to hot stretching. The stretching temperature is appropriately 270-380° C., and more preferably 290-320° C. If the stretching temperature is below 270° C. the porous film may have a low stretch ratio and suffer breakage, while a higher temperature above 380° C. may result in collapse of the porous structure, plugging of the pores and a consequently higher density. The heating may be accomplished by either a contact system or non-contact system, but it should be carried out as uniformly as possible.

The stretching method may be any method such as uniaxial stretching, successive biaxial stretching, simultaneous biaxial stretching or the like. For the stretching, reduction in the gas permeability can preferably be avoided by holding and restraining both sides in the direction of stretching.

The stretch ratio is preferably 1.3-5 in the case of uniaxial stretching or 1.3-10 in the case of biaxial stretching, but it is preferably selected in order to achieve a suitable balance between the porosity, gas permeability and Young's modulus. In the case of biaxial stretching, the stretching ratio of 1.3-10 may be determined as the product of the stretching ratios in both directions (the area ratio).

According to the invention there is also provided a polymetaphenylene isophthalamide-based polymer porous film containing inorganic whiskers and having a porosity of 10-80% and a specific Young's modulus of 200-5000 (kgf/mm$^2$)/(g/cm$^3$) in at least one direction.

In this porous film, the weight ratio of the polymetaphenylene isophthalamide-based polymer and the inorganic whiskers is 50:50 to 99:1 and, preferably, the inorganic whiskers have a long axis dimension L of 0.1-100 μm, a short axis dimension D of 0.01-10 μm and an L/D ratio of 1.5 or greater.

The polyamide porous film may be produced by a process that comprises casting a dope prepared by dissolving the polymetaphenylene isophthalamide-based polymer in an amide-based solvent and dispersing the inorganic whiskers therein, and coagulating the dope in a coagulating bath comprising an amide-based solvent containing a non-solvent for the polymer.

This production process may be carried out using exactly the same materials and in exactly the same manner as that described above for production of the polyamide porous film containing no inorganic whiskers.

The inorganic whiskers used here may be anisotropic fine filamentous crystals and, as examples, there may be mentioned inorganic whiskers of aluminum borate, potassium titanate, silicon carbide and silicon nitride. The long axis dimension L of the inorganic whiskers is preferably 0.1-100 μm and more preferably 1-20 μm while the short axis dimension D is preferably 0.01-10 μm and more preferably 0.05-2 μm; for thin-film purposes, the long axis dimension L is preferably 0.1-3 μm and the short axis dimension D is preferably 0.01-0.5 μm. Also, the L/D ratio is preferably 1.5 or greater, more preferably 2.0-1000, and most preferably 5.0-200. The long axis dimension is the length of the long axis, and the short axis dimension is the circle-equivalent diameter of a cross-section of the short axis.

The method of mixing the inorganic whiskers into the dope may be a method whereby the inorganic whiskers are blended with a solution of the polymetaphenylene isophthalamide-based polymer dissolved in an amide-based solvent, or a method whereby the inorganic whiskers are dispersed in an amide-based solvent and then the polymetaphenylene isophthalamide-based polymer is dissolved therein. The dispersion of the inorganic whiskers may be accomplished in a simple stirring tank, but it is preferably carried out using a ball mill, a kneader with a medium of beads, or a homomixer.

The weight ratio of the polymetaphenylene isophthalamide-based polymer to inorganic whiskers in the dope is 50:50 to 99:1, preferably 60:40 to 95:5 and more preferably 70:30 to 90:10. If the proportion of inorganic whiskers is greater than 50:50 the surface qualities of the film may be poorer, and if the proportion of whiskers is less than 99:1 a sufficient effect may not be achieved.

The polymetaphenylene isophthalamide-based polymer porous film obtained in this manner has a specific Young's modulus of 200-5000 (kgf/mm$^2$)/(g/cm$^3$) in at least one direction and a porosity of 10-80% and, by including inorganic whiskers, it can provide excellent heat resistance and a higher Young's modulus, thus allowing application for various different purposes.

According to the invention, there is also provided a porous film comprising at least two layers including a polymetaphenylene isophthalamide-based polymer porous layer and a heat-melting thermoplastic polymer porous layer (hereunder also referred to as "composite porous film").

The thermoplastic polymer used for the composite porous film of the invention is not particularly restricted, and as examples there may be mentioned polyester resins such as polyethylene terephthalate, and aliphatic polyamide resins such as 2,6-nylon. These thermoplastic resins preferably exhibit a "shutdown" property whereby they melt or deform, plugging the pores at a raised temperature, for example a high temperature at which the battery produces abnormal heat, and therefore their heat deformation temperature (temperature at which pores begin to be plugged due to heat contraction) is most preferably 60-150° C.

Polyolefins are preferred among these thermoplastic resins, and especially ultrahigh molecular weight polyolefins with weight average molecular weights of preferably 400,000 or greater and more preferably 800,000 or greater. As specific ultrahigh molecular weight polyolefins there may be mentioned polymers of ethylene, propylene, 1-butene, 4-methyl-1-pentene, 1-hexene and the like, among which high density, ultrahigh molecular weight polyethylene is particularly preferred.

The simple method of producing a porous film made of a polyolefin is one in which the polyolefin solution is extruded through a die and then cooled to obtain a gel composition which is then stretched to form pores, and examples of such methods are proposed in Japanese Examined Patent Publication No. 5-56251 and Japanese Unexamined Patent Publications No. 2-232242 and No. 3-64334.

The porous layer of the thermoplastic polymer preferably has a thickness of 5-50 μm, more preferably 7-30 μm and most preferably 10-20 µm. The porosity is preferably 30-70%, more preferably 40-65% and most preferably 50-60%.

On the other hand, the porous layer of the polymetaphenylene isophthalamide-based polymer has a thickness of preferably 5-100 µm, more preferably 7-50 µm and most preferably 10-30 µm, and the porosity is preferably 30-80%, more preferably 40-70% and most preferably 50-65%.

A composite film may be produced by a process that comprises forming a porous film made of a thermoplastic polymer as described above and, using this as a support, casting and coagulating a dope of a polymetaphenylene isophthalamide-based polymer onto one or both sides thereof, as described in detail above for production of the polyamide porous film and the inorganic whisker-containing polyamide porous film. The materials and conditions for each step are, of course, exactly the same as those described above.

The composite porous film obtained in this manner has a total thickness of preferably 10-150 µm, more preferably 14-80 µm and most preferably 20-50 µm. The total porosity is preferably 30-70%, more preferably 40-65% and most preferably 50-60%.

The composite porous film of the invention may also employ a polyvinylidene fluoride-based polymer as a heat melting thermoplastic polymer. As examples of polyvinylidene fluoride-based polymers that are useful for the invention there may be mentioned those described in U.S. Pat. No. 5,296,318 (copolymer of vinylidene fluoride and hexafluoropropylene), U.S. Pat. No. 5,571,634 (copolymer of vinylidene fluoride and chlorotrifluoroethylene) and Japanese Unexamined Patent Publication No. 9-289038 (copolymer of vinylidene fluoride and a perfluoroalkyl vinyl ether).

Specifically there may be mentioned polyvinylidene fluoride or copolymers in which it is the main component, and as copolymer components that may be suitably used in such copolymers there may be mentioned hexafluoropropylene, perfluoro lower alkyl vinyl ethers such as perfluoromethyl vinyl ether, and chlorotrifluoroethylene, vinyl fluoride, tetrafluoroethylene and the like; binary polymers and terpolymers of these copolymer components with vinylidene fluoride are also suitable as polymer materials for the invention.

The method for production of a composite porous film with a polyvinylidene fluoride-based polymer porous layer is not particularly restricted, and one example is a method in which a porous film composed of a polymetaphenylene isophthalamide-based polymer is formed in the manner described above, and then a dope comprising a solution of the polyvinylidene fluoride-based polymer (hereunder referred to as "fluorine-based dope") is cast onto one or both sides thereof and coagulated.

As examples of solvents for the fluorine-based dope there may be mentioned amide-based solvents such as dimethylformamide, diethylformamide, dimethylsulfoxide, N-methyl-2-pyrrolidone, dimethylacetamide, diethylacetamide and hexamethylphosphoramide, which are water-soluble aprotic polar solvents, but there is no limitation to these.

A water-soluble phase separator may be added to the fluorine-based dope as a pore forming agent. As specific water-soluble phase separators there may be mentioned polyethylene glycol with a molecular weight of 200-1000, ethylene glycol, diethylene glycol, triethylene glycol, polyethyleneglycol monomethyl ether with a molecular weight of 200-1000, glycerin, 1,4-butanediol, 1,3-butanediol, propylene glycol, methanol, ethanol, isopropyl alcohol, 1-butanol, 2-butanol, tert-amyl alcohol, diacetone alcohol, ε-caprolactone, γ-butyrolactone, ethylene carbonate, propylene carbonate and triethyl phosphate; however, there is no limitation to these. These phase separators may be used alone or in combinations of two or more thereof.

The polymer concentration in the fluorine-based dope is preferably 3-30 wt %. At less then 3 wt % the mechanical properties of the film may be inadequate, and at greater than 30 wt % it may be difficult to obtain a film with high porosity. The mixing proportion of the water-soluble solvent and the phase separator is preferably in the range such that the solvent/phase separator ratio is 10/0-5/5 (weight ratio). If the proportion of the phase separator is greater than 5/5 considerable gelling of the dope may occur, making it difficult to form a film and leading to inadequate mechanical properties of the resulting porous film.

The fluorine-based dope that is obtained is cast on the polymetaphenylene isophthalamide-based polymer porous film and then conveyed through a coagulating bath for coagulation.

The coagulating bath is one that is a good solvent for the polyvinylidene fluoride-based polymer, and mixtures of amide-based solvents such as dimethylformamide, diethylformamide, dimethylsulfoxide, N-methyl-2-pyrrolidone, dimethylacetamide, diethylacetamide and hexamethylphosphoramide, which are water-soluble aprotic polar solvents, and non-solvents for polyvinylidene fluoride-based polymers such as lower alcohols, lower ethers and water, which are compatible with these solvents, may also be used; here, water is most preferred as the non-solvent.

When a phase separator is added to the dope, the amide-based solvent is preferably used in the coagulating bath so that the ratio of the amide-based solvent/phase separator in the dope is the same.

The coagulating bath preferably has an amide-based solvent or amide-based solvent/phase separator mixed solvent concentration which is in a range of 5-70 wt % in total. If the concentration of the amide-based solvent or amide-based solvent/phase separator mixed solvent is less than 5 wt %, a dense surface layer (skin layer) may be formed on the coagulated surface, which can hamper impregnation of the electrolytic solution during use as a battery separator, while if it is higher than 70 wt % the coagulation time is prolonged, which can be disadvantageous in terms of productivity. The temperature of the coagulating bath is preferably in the range of 10-60° C.

The coagulated film obtained in this manner may then be preferably rinsed and dried.

The porous film of the invention obtained by the method described above is suitable for such uses as filtration membranes for incinerator exhaust gases, bag filters or roll filters impregnated with cleaning fluids used for cleaning the ink remaining on copy machine transfer drums, which require high heat resistance and a high Young's modulus, and OA cleaners that require high heat resistance and strength; in addition, these porous films are particularly useful as battery separators which require excellent heat resistance, chemical resistance and dimensional stability as well as a high Young's modulus and sufficient porosity.

Consequently, the invention provides a battery separator comprising such porous films.

The battery separator of the invention has particularly excellent surface uniformity and mechanical strength. It is also excellent as a battery separator because it exhibits excellent electrolytic solution holding power and heat resistance and is particularly suited for use in batteries with high capacity density, while also having excellent heat resistance, solution retention and mechanical properties, and high uniformity of thickness.

The battery separator of the invention may be used in a lithium ion battery according to the invention according to a known method, such as any of the methods described in the examples provided below or the method described in Japanese Unexamined Patent Publication No. 10-64503.

The present invention will now be further illustrated by way of the following examples and comparative examples which, however, are in no way intended to restrict the invention.

The various properties mentioned throughout the present specification were determined by the following methods.

[Gas Permeability]

The volume of air permeating per unit of time (ml/sec) was determined according to the method of "JIS L1096-1990 6.27 gas permeability".

[Gas Permeability Retention]

The gas permeability is measured before and after heat treatment in air at 350° C. for 10 minutes, and the gas permeability retention is defined according to the following formula where $T_0$ ml/sec is the value of the gas permeability before treatment and T ml/sec is the value after treatment.

Gas permeability retention=$(T/T_0) \times 100$ (%)

[Porosity]

The dried porous film is cut to a size of A (mm)×B (mm), and the thickness C (mm) and weight D (g) are measured (A, B, C and D are appropriately selected). The apparent density E is determined according to the following formula.

Apparent density $E=D/(A \times B \times C) \times 1000$ (g/cm$^3$)

The true density F of the polymer used is then determined, and the porosity is calculated by the following formula.

Porosity=$[(F-E)/F] \times 100$ (%)

[Specific Young's Modulus]

The Young's modulus (kg/mm$^2$) of the porous film as measured by a tensile test is given as the value divided by the apparent density of the measured porous film.

[Cross-Sectional Pore Laminar Coefficient]

An SEM photograph of a cross-section of the porous film is taken, the pores are observed to an area 5 times the width in the lengthwise direction with respect to the film thickness t, and the maximum length of the pore sizes in the cross-section in the direction of thickness is defined as d. For example, when multiple circular pores are present in the film cross-section, the maximum diameter is d.

The cross-sectional pore laminar coefficient is defined by the following equation, where p is the porosity of the porous film.

Cross-Sectional Pore Laminar Coefficient=$(t \cdot p)/100d$

EXAMPLE 1

A dope comprising a mixed solution of polymetaphenylene isophthalamide (relative viscosity=1.8) and N-methyl-2-pyrrolidone (NMP) in a weight ratio of 10:90 was cast onto a polypropylene film to a thickness of 200 μm. This was immersed for 10 minutes in a coagulating bath at 30° C. comprising 55 wt % NMP and 45 wt % water. The coagulated product was then rinsed with water and dried for 30 minutes with a hot air drier at 130° C. to obtain a porous film.

The porosity of the resulting polyamide porous film was 70%, the gas permeability was 1.0 ml/sec and the cross-sectional pore laminar coefficient was 39.2.

EXAMPLE 2

A dope comprising a mixed solution of polymetaphenylene isophthalamide (relative viscosity=1.8), calcium chloride and NMP in a weight ratio of 9.5:4.5:86.0 was cast in the same manner as Example 1. This was immersed for 10 minutes in a coagulating bath at 30° C. comprising 60 wt % NMP and 40 wt % water. The coagulated product was then rinsed with water and dried for 30 minutes with a hot air drier at 130° C. to obtain a porous film.

The porosity of the resulting polyamide porous film was 72%, the gas permeability was 1.3 ml/sec and the cross-sectional pore laminar coefficient was 42.5.

EXAMPLE 3

The procedure of Example 1 was repeated, and after coagulation, the coagulated product was immersed for 10 minutes in a solution at 70° C. comprising 60 wt % NMP and 40 wt % water, and then rinsed with water and dried to obtain a porous film. The porous film had a DMF insoluble portion of 60%.

The porosity of the resulting polyamide porous film was 73%, the gas permeability was 1.0 ml/sec and the cross-sectional pore laminar coefficient was 37.8.

After heat treatment of the porous film at 350° C. for 10 minutes in air the porosity was 71% and the gas permeability was 0.8 ml/sec, and therefore the gas permeability retention was 80%.

The polyamide porous film was used as a separator in combination with a lithium cobaltate-based anode material, a carbonaceous cathode material and 1 M LiBF$_4$PC/DEC (1/1 weight ratio) as the electrolytic solution, to form a button battery with a diameter of 16 mm. The battery was subjected to a 10-cycle test between 2.5-4.2 V with a constant current of 1.0 mA, and the charge and discharge was satisfactorily reproduced.

EXAMPLE 4

A porous film was obtained in the same manner as Example 1, except that the temperature of the coagulating bath was 80° C. The porous film had a DMF insoluble portion of 90%.

The porosity of the resulting polyamide porous film was 69%, the gas permeability was 1.1 ml/sec and the cross-sectional pore laminar coefficient was 42.8.

After heat treatment of the porous film at 350° C. for 10 minutes in air the porosity was 68% and the gas permeability was 1.0 ml/sec, and therefore the gas permeability retention was 91%.

The polyamide porous film was used as a separator in combination with a lithium cobaltate-based anode material, a carbonaceous cathode material and 1 M LiBF$_4$PC/DEC (1/1 weight ratio) as the electrolytic solution, to form a button battery with a diameter of 16 mm. The battery was subjected to a 10-cycle test between 2.5-4.2 V with a constant current of 1.0 mA, and the charge and discharge was satisfactorily reproduced.

EXAMPLE 5

A porous film was obtained in the same manner as Example 4. After heat treatment of the porous film at 340° C. for 5 minutes in air the porosity was 68% and the gas permeability was 1.1 ml/sec, and therefore the gas permeability retention was 98%.

The polyamide porous film was used as a separator in combination with a lithium cobaltate-based anode material, a carbonaceous cathode material and 1 M LiBF$_4$PC/DEC (1/1 weight ratio) as the electrolytic solution, to form a button battery with a diameter of 16 mm. The battery was subjected to a 10-cycle test between 2.5-4.2 V with a constant current of 1.0 mA, and the charge and discharge was satisfactorily reproduced.

EXAMPLE 6

The procedure of Example 1 was repeated to prepare a dope which was cast. This was immersed for 10 minutes in a coagulating bath at 30° C. comprising 60 wt % NMP and 40 wt % water. The coagulated product was then immersed for 5 minutes in a stretching bath at 50° C. comprising 50 wt % NMP and 50 wt % water, and then stretched in the bath to a factor of 3 using a lateral restraining uniaxial stretching machine. The stretched film was then rinsed with water and dried for 30 minutes with a hot air drier at 130° C. to obtain a porous film.

The porosity of the resulting polyamide porous film was 68%, the gas permeability was 2.0 ml/sec, the specific Young's modulus was 330 (kgf/mm$^2$)/(g/cm$^3$) in the stretching direction and 170 (kgf/mm$^2$)/(g/cm$^3$) in the direction orthogonal thereto, and the cross-sectional pore laminar coefficient was 50.3.

The polyamide porous film was used as a separator in combination with a lithium cobaltate-based anode material, a carbonaceous cathode material and 1 M LiBF$_4$PC/DEC (1/1 weight ratio) as the electrolytic solution, to form a button battery with a diameter of 16 mm. The battery was subjected to a 10-cycle test between 2.5-4.2 V with a constant current of 1.0 mA, and the charge and discharge was satisfactorily reproduced.

EXAMPLE 7

The procedure of Example 6 was repeated, and the stretching was followed by further stretching to a factor of 3 in the direction orthogonal to the first stretching direction. After then rinsing with water, the 4 sides were attached to a metal frame and drying was carried out for 30 minutes using a hot air drier at 130° C. to obtain a porous film.

The porosity of the resulting polyamide porous film was 65%, the gas permeability was 5.0 ml/sec, the specific Young's modulus was 320 (kgf/mm$^2$)/(g/cm$^3$) in the first stretching direction and 330 (kgf/mm$^2$)/(g/cm$^3$) in the second stretching direction, and the cross-sectional pore laminar coefficient was 5.2.

The polyamide porous film was used as a separator in combination with a lithium cobaltate-based anode material, a carbonaceous cathode material and 1 M LIBF$_4$PC/DEC (1/1 weight ratio) as the electrolytic solution, to form a button battery with a diameter of 16 mm. The battery was subjected to a 10-cycle test between 2.5-4.2 V with a constant current of 1.0 mA, and the charge and discharge was satisfactorily reproduced.

COMPARATIVE EXAMPLE 1

A dope comprising a mixed solution of polymetaphenylene isophthalamide (relative viscosity=1.8), calcium chloride and NMP in a weight ratio of 15:0.3:85 was cast in exactly the same manner as Example 1. This was immersed in a coagulating bath consisting of water at 50° C. and then immediately stretched to a factor of 1.2 and immersed for 5 minutes. The coagulated product was then rinsed with water and dried for 30 minutes with a hot air drier at 130° C. to obtain a porous film.

The porosity of the resulting polyamide porous film was 85%, the gas permeability was 0.06 ml/sec and the cross-sectional pore laminar coefficient was 1.3.

EXAMPLE 8

The porous film obtained in Example 1 was stretched to a factor of 2 in air while contacting it with a rod heater with a 5 mm diameter which had been heated to 320° C., to obtain an oriented porous film.

The porosity of the oriented polyamide porous film was 75%, the gas permeability was 2.5 ml/sec, the specific Young's modulus was 350 (kgf/mm$^2$)/(g/cm$^3$) in the stretching direction and 170 (kgf/mm$^2$)/(g/cm$^3$) in the direction orthogonal thereto, and the cross-sectional pore laminar coefficient was 23.2.

After heat treatment of the porous film at 350° C. for 10 minutes in air the porosity was 71%, the gas permeability was 2 ml/sec, the specific Young's modulus was 360 (kgf/mm$^2$)/(g/cm$^3$) in the stretching direction and 180 (kgf/mm$^2$)/(g/cm$^3$) in the direction orthogonal thereto, and the cross-sectional pore laminar coefficient was 21.9. The gas permeability retention was therefore 80%.

The polyamide porous film was used as a separator in combination with a lithium cobaltate-based anode material, a carbonaceous cathode material and 1 M LiBF$_4$PC/DEC (1/1 weight ratio) as the electrolytic solution, to form a button battery with a diameter of 16 mm. The battery was subjected to a 10-cycle test between 2.5-4.2 V with a constant current of 1.0 mA, and the charge and discharge was satisfactorily reproduced.

EXAMPLE 9

The porous film obtained in Example 3 was stretched to a factor of 2 in air while contacting it with a rod heater with a 5 mm diameter which had been heated to 360° C., to obtain an oriented porous film.

The porosity of the oriented polyamide porous film was 75%, the gas permeability was 2.9 ml/sec, the specific Young's modulus was 340 (kgf/mm$^2$)/(g/cm$^3$) in the stretching direction and 180 (kgf/mm$^2$)/(g/cm$^3$) in the direction orthogonal thereto, and the cross-sectional pore laminar coefficient was 20.3.

After heat treatment of the porous film at 350° C. for 10 minutes in air the porosity was 61%, the gas permeability was 2.5 ml/sec, the specific Young's modulus was 350 (kgf/mm$^2$)/(g/cm$^3$) in the stretching direction and 190 (kgf/mm$^2$)/(g/cm$^3$) in the direction orthogonal thereto, and the cross-sectional pore laminar coefficient was 19.5. The gas permeability retention was therefore 86%.

The polyamide porous film was used as a separator in combination with a lithium cobaltate-based anode material, a carbonaceous cathode material and 1 M LiBF$_4$PC/DEC (1/1 weight ratio) as the electrolytic solution, to form a button battery with a diameter of 16 mm. The battery was subjected to a 10-cycle test between 2.5-4.2 V with a constant current of 1.0 mA, and the charge and discharge was satisfactorily reproduced.

EXAMPLE 10

The porous film obtained in Example 4 was stretched to a factor of 2.5 in air while contacting it with a rod heater with a 5 mm diameter which had been heated to 360° C., and it was then stretched to a factor of 2.5 in the direction orthogonal to the first stretching direction, to obtain a biaxial oriented porous film.

The porosity of the oriented polyamide porous film was 78%, the gas permeability was 12.5 ml/sec, the specific Young's modulus was 330 (kgf/mm$^2$)/(g/cm$^3$) in the first stretching direction and 350 (kgf/mm$^2$)/(g/cm$^3$) in the second stretching direction, and the cross-sectional pore laminar coefficient was 4.5.

After heat treatment of the porous film at 350° C. for 10 minutes in air the porosity was 76%, the gas permeability was 10.0 ml/sec, the specific Young's modulus was 340 (kgf/mm$^2$)/(g/cm$^3$) in the first stretching direction and 360 (kgf/mm$^2$)/(g/cm$^3$) in the second stretching direction, and the cross-sectional pore laminar coefficient was 4.1. The gas permeability retention was therefore 80%.

The polyamide porous film was used as a separator in combination with a lithium cobaltate-based anode material, a carbonaceous cathode material and 1 M LiBF$_4$PC/DEC (1/1 weight ratio) as the electrolytic solution, to form a button battery with a diameter of 16 mm. The battery was subjected to a 10-cycle test between 2.5-4.2 V with a constant current of 1.0 mA, and the charge and discharge was satisfactorily reproduced.

EXAMPLE 11

A dope was prepared comprising an NMP solution containing 10 wt % polymetaphenylene isophthalamide (registered trademark: Cornex, by Teijin; relative viscosity: IV (in H$_2$SO$_4$)=1.8). The dope was then cast onto a polypropylene film using a coater with a blade/film clearance of 30 μm, and then coagulated for 5 minutes with a coagulating bath of water/NMP (45/55 weight ratio) at 80° C. The coagulated product was rinsed with water at 80° C. and then dried with a hot air drier at 130° C. at a constant length to obtain a porous film. The porous film was contacted with a stretching hot plate at 360° C. for stretching to a factor of 3 in the lengthwise direction to obtain an oriented porous film.

The oriented polyamide porous film had a thickness of 2.5 μm, a porosity of 63%, a gas permeability of 5 ml/sec, a specific Young's modulus of 340 (kgf/mm$^2$)/(g/cm$^3$) in the stretching direction and 180 (kgf/mm$^2$)/(g/cm$^3$) in the direction orthogonal thereto, and a cross-sectional pore laminar coefficient of 4.0.

After heat treatment of the porous film at 350° C. for 10 minutes in air the porosity was 61%, the gas permeability was 4 ml/sec, the specific Young's modulus was 500 (kgf/mm$^2$)/(g/cm$^3$) in the stretching direction and 100 (kgf/mm$^2$)/(g/cm$^3$) in the direction orthogonal thereto, and the cross-sectional pore laminar coefficient was 3.2. The gas permeability retention was therefore 80%.

The polyamide porous film was used as a separator in combination with a lithium cobaltate-based anode material, a carbonaceous cathode material and 1 M LiBF$_4$PC/DEC (1/1 weight ratio) as the electrolytic solution, to form a button battery with a diameter of 16 mm. The battery was subjected to a 10-cycle test between 2.5-4.2 V with a constant current of 1.0 mA, and the charge and discharge was satisfactorily reproduced.

EXAMPLE 12

Potassium titanate whiskers by Otsuka Chemical Co. (10 μm long axis×0.5 μm short axis, density: 3.3 g/cm$^3$) were dispersed in a solution comprising a mixture of polymetaphenylene isophthalamide and N-methyl-2-pyrrolidone (NMP) for casting, to prepare a dope with an inorganic whisker/polymetaphenylene isophthalamide/NMP ratio of 1/10/100 by weight, and a whisker-containing polyamide porous film was obtained in exactly the same manner as Example 1 except that the dope was cast onto a polypropylene film to a thickness of 100 μm.

The polyamide porous film had a thickness of 30 μm, a porosity of 62%, a gas permeability of 0.8 ml/sec, and a specific Young's modulus of 600 (kgf/mm$^2$)/(g/cm$^3$) in the stretching direction and 550 (kgf/mm$^2$)/(g/cm$^3$) in the direction orthogonal thereto.

The polyamide porous film was used as a separator in combination with a lithium cobaltate-based anode material, a carbonaceous cathode material and 1 M LiBF$_4$PC/DEC (1/1 weight ratio) as the electrolytic solution, to form a button battery with a diameter of 16 mm. The battery was subjected to a 10-cycle test between 2.5-4.2 V with a constant current of 1.0 mA, and the charge and discharge was satisfactorily reproduced.

EXAMPLE 13

A whisker-containing polyamide porous film was obtained in the same manner as Example 1, except that aluminum borate whiskers by Shikoku Chemical Co. (20 μm long axis× 0.5 μm short axis, density: 3.0 g/cm$^3$) were used, the inorganic whiskers/polymetaphenylene isophthalamide/NMP ratio of the dope used was 1/20/100 and the thickness of the dope during casting was 70 μm.

The polyamide porous film had a thickness of 20 μm, a porosity of 65%, a gas permeability of 0.4 ml/sec, a specific Young's modulus of 500 (kgf/mm$^2$)/(g/cm$^3$) in the stretching direction and 450 (kgf/mm$^2$)/(g/cm$^3$) in the direction orthogonal thereto, and a cross-sectional pore laminar coefficient of 16.3.

The polyamide porous film was used as a separator in combination with a lithium cobaltate-based anode material, a carbonaceous cathode material and 1 M LiBF$_4$PC/DEC (1/1 weight ratio) as the electrolytic solution, to form a button battery with a diameter of 16 mm. The battery was subjected to a 10-cycle test between 2.5-4.2 V with a constant current of 1.0 mA, and the charge and discharge was satisfactorily reproduced.

EXAMPLE 14

A whisker-containing polyamide porous film was obtained in the same manner as Example 11, except that the thickness of the dope during casting was 200 μm. It was then stretched to a factor of 3 in the uniaxial direction at a stretch rate of 20 mm/min by contact with a hot plate at 350° C.

The whisker-containing polyamide porous film had a thickness of 22 μm, a porosity of 65%, a gas permeability of 2.0 ml/sec, and a specific Young's modulus of 2500 (kgf/mm$^2$)/(g/cm$^3$) in the stretching direction and 450 (kgf/mm$^2$)/(g/cm$^3$) in the direction orthogonal thereto.

The polyamide porous film was used as a separator in combination with a lithium cobaltate-based anode material, a carbonaceous cathode material and 1 M LiBF$_4$PC/DEC (1/1 weight ratio) as the electrolytic solution, to form a button battery with a diameter of 16 mm. The battery was subjected to a 10-cycle test between 2.5-4.2 V with a constant current of 1.0 mA, and the charge and discharge was satisfactorily reproduced.

EXAMPLE 15

A whisker-containing polyamide porous film was obtained in the same manner as Example 12, except that the thickness of the dope during casting was 150 μm. It was then stretched to a factor of 3 in the uniaxial direction at a stretch rate of 20 mm/min by contact with a hot plate at 290° C.

The polyamide porous film had a thickness of 16 μm, a porosity of 59%, a gas permeability of 0.8 ml/sec, a specific Young's modulus of 1800 (kgf/mm$^2$)/(g/cm$^3$) in the stretching direction and 400 (kgf/mm$^2$)/(g/cm$^3$) in the direction orthogonal thereto, and a cross-sectional pore laminar coefficient of 9.2.

The polyamide porous film was used as a separator in combination with a lithium cobaltate-based anode material, a carbonaceous cathode material and 1 M LiBF$_4$PC/DEC (1/1 weight ratio) as the electrolytic solution, to form a button battery with a diameter of 16 mm. The battery was subjected to a 10-cycle test between 2.5-4.2 V with a constant current of 1.0 mA, and the charge and discharge was satisfactorily reproduced.

EXAMPLE 16

A dope comprising a mixed solution of polymetaphenylene isophthalamide (relative viscosity=1.8) and N-methyl-2-pyrrolidone (NMP) in a weight ratio of 10:90 was cast onto an ultrahigh molecular weight polyethylene porous film with a thickness of 20 μm and a porosity of 50% (registered trademark: Solpour, by Teijin DSM Soltech, K K.), to a thickness of 100 μm, and then this was immersed for 10 minutes in a coagulating bath at 30° C. comprising 60 wt % NMP and 40 wt % water, rinsed with water and dried at 110° C. to obtain a composite porous film.

The composite porous film had a thickness of 50 μm, a porosity of 60% and a cross-sectional pore laminar coefficient of 24.6 and had continuous pores with a gas permeability of 0.30 ml/sec.

When the porous film was heated for 5 minutes at 170° C., the pores became plugged resulting in a gas permeability of substantially 0, thereby confirming that a shutdown property was exhibited. No deformation or contraction of the film itself was observed.

EXAMPLE 17

The procedure of Example 6 was repeated, and the stretching was followed by further stretching to a factor of 3 in the direction orthogonal to the first direction of stretching. After then rinsing with water, the 4 sides were attached to a metal frame and drying was carried out for 30 minutes using a hot air drier at 130° C. to obtain a porous film.

The polyamide porous film had a porosity of 65%, a gas permeability of 5.0 ml/sec, a specific Young's modulus of 320 (kgf/mm$^2$)/(g/cm$^3$) in the first stretching direction and 330 (kgf/mm$^2$)/(g/cm$^3$) in the second stretching direction, and a cross-sectional pore laminar coefficient of 3.7.

A PVDF copolymer comprising vinylidene fluoride and hexafluoropropylene in a molar ratio of 95/5 was dissolved in a mixed solution comprising dimethylacetamide (DMAc) and polypropylene glycol (PPG) at a weight ratio of 60/40 to prepare a dope with a copolymer concentration of 13 wt %, this was cast onto both surfaces of the aforementioned polyamide porous film to a thickness of 30 μm, and after immersion for 5 minutes in a coagulating bath at 30° C. comprising DMAc/PPG/water in a ratio of 24/16/60 by weight, the film was rinsed with water and dried for 30 minutes with a hot air drier at 80° C. to obtain a composite film. The thickness of the resulting composite film was 15 μm, the porosity was 58% and the cross-sectional pore laminar coefficient was 10.9.

The composite film was used as a separator in combination with a lithium cobaltate-based anode material, a carbonaceous cathode material and 1 M LiBF$_4$PC/DEC (1/1 weight ratio) as the electrolytic solution, to form a button battery with a diameter of 16 mm. The battery was subjected to a 10-cycle test between 2.5-4.2 V with a constant current of 1.0 mA, and the charge and discharge was satisfactorily reproduced.

INDUSTRIAL APPLICABILITY

According to the present invention it is possible to provide a polymetaphenylene isophthalamide-based polymer porous film which maintains its porous structure while exhibiting excellent heat resistance, chemical resistance and dimensional stability as well as a high Young's modulus and sufficient gas permeability, and is therefore suitable for such uses as battery separator films that require excellent heat resistance, chemical resistance and dimensional stability as well as a high Young's modulus and sufficient gas permeability, filtration membranes for incinerator exhaust gases, bag filters or roll filters impregnated with cleaning fluids used for cleaning the ink remaining on copy machine transfer drums, which require high heat resistance and a high Young's modulus, and OA cleaners that require high heat resistance and strength. As a process for production of such a polymetaphenylene isophthalamide-based polymer porous film there is provided a process that can easily accomplish stretching at low temperature without requiring an expensive high-temperature tenter and that can provide a polyamide porous film with a high Young's modulus without destroying the porous structure.

The invention claimed is:

1. A polymetaphenylene isophthalamide-based polymer porous film with a gas permeability of 0.2-1000 ml/sec, which retains at least 60% of its gas permeability after heat treatment at 350° C. for 10 minutes compared to before treatment, while also having a porous structure with a porosity of 60-80% and a cross-sectional pore laminar coefficient of 2.5 or greater, and having a specific Young's modulus of 200-800 (kgf/mm$^2$)/(g/cm$^3$) in at least one direction, and containing inorganic whiskers having a long axis dimension L of 10-100 μm.

2. A porous film according to claim 1, which has a thickness of 1-10 μm and is self-supporting.

3. A process for the production of a polymetaphenylene isophthalamide-based polymer porous film according to claim 1, comprising casting a dope prepared by dissolving a polymetaphenylene isophthalamide-based polymer in an amide-based solvent, and coagulating it in a coagulating bath comprising an amide-based solvent containing a non-solvent for said polymer to produce a polymetaphenylene isophthalamide-based polymer porous film according to claim 1.

4. A process according to claim 3, wherein the concentration of the amide-based solvent in the coagulating bath is 30-80 wt % and the temperature is 0-98° C.

5. A process according to claim 3 or 4, wherein the non-solvent for the polymetaphenylene isophthalamide-based polymer is water.

6. A process according to claim 3, wherein the dope prepared by dissolving a polymetaphenylene isophthalamide-based polymer in an amide-based solvent contains no inorganic salts.

7. A process according to claim 3, wherein after coagulation, the porous film is rinsed with water, dried and then stretched to a factor of 1.3-5 in the uniaxial direction or to a factor of 1.3-10 in the orthogonal biaxial directions on an area scale, at a temperature of 270-340° C.

8. A process according to claim 3 wherein, after coagulation, the porous film is further stretched in a stretching bath comprising an amide-based solvent containing a non-solvent for the polymetaphenylene isophthalamide-based polymer.

9. A process according to claim 8, wherein the concentration of the amide-based solvent in the stretching bath is 5-70 wt % and the temperature is 0-98° C.

10. A process according to claim 3, wherein the coagulation is followed by immersion in a bath comprising an amide-based solvent containing a non-solvent for the polymetaphenylene isophthalamide-based polymer, with an amide-based solvent concentration of 50-80 wt % and a temperature of 50-98° C.

11. A process according to claim 10, wherein the dimethylformamide-insoluble portion of the porous film after immersion is 10% or greater.

12. A process according to claim 10 or 11, wherein after the immersion the porous film is rinsed with water, dried and then heat treated at a temperature of 290-380° C.

13. A process according to claim 10 or 11, wherein after the immersion the porous film is rinsed with water, dried and then stretched to a factor of 1.3-5 in the uniaxial direction or to a factor of 1.3-10 in the orthogonal biaxial directions on an area scale, at a temperature of 270-380° C.

14. A process according to claim 10 or 11, wherein after the immersion the porous film is further stretched in a stretching bath comprising an amide-based solvent containing a non-solvent for the polymetaphenylene isophthalamide-based polymer.

15. A process according to claim 14 wherein, after the stretching, the porous film is rinsed with water, dried and then heat treated at a temperature of 290-380° C.

16. A process according to claim 14, wherein the concentration of the amide-based solvent in the stretching bath is 5-70 wt % and the temperature is 0-98° C.

17. A process according to claim 3, wherein the dope used is one in which inorganic whiskers are dispersed and a polymetaphenylene isophthalamide-based polymer is dissolved in an amide-based solvent.

18. A process according to claim 17, wherein the weight ratio of the polymetaphenylene isophthalamide-based polymer to the whiskers is 50:50 to 99:1.

19. A process according to claim 17 or 18, wherein the inorganic whiskers have a short axis dimension D of 0.01-10 μm and an L/D ratio of 1.5 or greater.

20. A porous film comprising at least two layers including a polymetaphenylene isophthalamide-based polymer porous layer and a heat-melting thermoplastic polymer porous layer, wherein the polymetaphenylene isophthalamide-based polymer porous layer is a polymetaphenylene isophthalamide-based polymer porous film according to claim 1.

21. A porous film according to claim 20, wherein the thermoplastic polymer is a polyolefin with a molecular weight of 400,000 or greater.

22. A porous film according to claim 20, wherein the thermoplastic polymer is a polyvinylidene fluoride-based polymer.

23. A porous film according to claim 22, wherein the polyvinylidene fluoride-based polymer is a copolymer composed mainly of vinylidene fluoride and a perfluoro lower alkyl vinyl ether.

24. A porous film according to any one of claims 20 to 23 wherein, at elevated temperatures, the thermoplastic polymer layer melts and plugs the pore gaps, while the polymetaphenylene isophthalamide-based polymer layer retains its shape without melting.

25. A process for the production of a porous film which comprises forming a porous layer of a polymetaphenylene isophthalamide-based polymer onto one or both sides of a porous film made of a heat-melting thermoplastic polymer, or forming a porous layer made of a heat-melting thermoplastic polymer onto one or both sides of a porous film of a polymetaphenylene isophthalamide-based polymer, wherein the polymetaphenylene isophthalamide-based polymer porous layer is a polymetaphenylene isophthalamide-based polymer porous film according to claim 1.

26. A battery separator comprising a porous film according to any one of claims 20 to 23.

27. A lithium ion battery comprising a battery separator according to claim 26.

28. A polymetaphenylene isophthalamide-based polymer porous film containing inorganic whiskers having a long axis dimension L of 10-100 μm and having a porosity of 10-80% and a specific Young's modulus of 200-5000 (kgf/mm$^2$)/(g/cm$^3$) in at least one direction and having a cross-sectional pore laminar coefficient of 2.5 or greater.

29. A polymetaphenylene isophthalamide-based polymer porous film according to claim 28, wherein the weight ratio of the polymetaphenylene isophthalamide-based polymer to the whiskers is 50:50 to 99:1.

30. A polymetaphenylene isophthalamide-based polymer porous film containing inorganic whiskers with a long axis dimension L of 10-100 μm, a short axis dimension D of 0.01-10 μm and an L/D ratio of 1.5 or greater, and having a porosity of 10-80% and a specific Young's modulus of 200-5000 (kgf/mm$^2$)/(g/cm$^3$) in at least one direction, and having a cross-sectional pore laminar coefficient of 2.5 or greater.

31. A method of using a porous film according to any one of claims 1 and 2,28,29,30 comprising placing said porous film as a battery separator between a positive electrode and a negative electrode in a battery.

32. A lithium ion battery comprising a battery separator situated between a positive electrode and a negative electrode, wherein said battery separator consists of a porous film according to any one of claims 1, and 2,28,29,30.

33. A polymetaphenylene isophthalamide-based polymer porous film with a gas permeability of 0.2-1000 ml/sec, which retains at least 60% of its gas permeability after heat treatment at 360° C. for 10 minutes compared to before treatment, while also having a porous structure with a porosity of 60-80% and a cross-sectional pore laminar coefficient of 2.5 or greater and containing inorganic whiskers having a long axis dimension L of 10-100 μm, and which is obtained by a process comprising a step of casting a dope prepared by dissolving a polymetaphenylene isophthalamide-based polymer in an amide-based solvent and a step of coagulating the cast dope in a coagulating bath comprising an amide-based solvent containing a non-solvent for the polymer.

34. A method of using a polymetaphenylene isophthalamide-based polymer porous film, comprising disposing a polymetaphenylene isophthalamide-based polymer porous film as a separator between an anode and a cathode of a battery, wherein the porous film has a gas permeability of 0.2-1000 ml/sec, retains at least 60% of its gas permeability after heat treatment at 360° C. for 10 minutes compared to before treatment, while also having a porous structure with a porosity of 60-80% and a cross-sectional pore laminar coefficient of 2.5 or greater and containing inorganic whiskers having a long axis dimension L of 10-100 μm, and having a specific Young's modulus of 200-5000 $(kgf/mm^2)/(g/cm^3)$ in at least one direction.

* * * * *